(12) United States Patent
Lee et al.

(10) Patent No.: US 8,133,633 B2
(45) Date of Patent: Mar. 13, 2012

(54) STRUCTURE OF CATHODE ELECTRODE FOR FUEL CELL

(75) Inventors: Seung-jae Lee, Seongnam-si (KR); Ji-rae Kim, Seoul (KR); Yoon-hoi Lee, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1437 days.

(21) Appl. No.: 11/445,309

(22) Filed: Jun. 2, 2006

(65) Prior Publication Data

US 2007/0172718 A1    Jul. 26, 2007

(30) Foreign Application Priority Data

Jan. 21, 2006 (KR) .................. 10-2006-0006585

(51) Int. Cl.
*H01M 8/10* (2006.01)
(52) U.S. Cl. ........ 429/484; 429/488; 429/489; 429/479; 429/480; 429/523
(58) Field of Classification Search .................. 429/534, 429/531, 512, 523, 484, 488, 489, 479, 480
See application file for complete search history.

(56) References Cited

U.S. PATENT DOCUMENTS

| | | | |
|---|---|---|---|
| 6,509,112 B1* | 1/2003 | Luft et al. ........................ | 429/13 |
| 2001/0041283 A1* | 11/2001 | Hitomi ............................ | 429/42 |
| 2002/0031696 A1* | 3/2002 | Kawahara et al. ............... | 429/30 |
| 2003/0044672 A1* | 3/2003 | Fukumoto et al. .............. | 429/40 |
| 2004/0166397 A1* | 8/2004 | Valdez et al. ................... | 429/44 |

FOREIGN PATENT DOCUMENTS

| | | |
|---|---|---|
| JP | 63-21752 | 1/1988 |
| JP | 2003-272640 | 9/2003 |

OTHER PUBLICATIONS

Behm et al., Influence of Structure and Composition Upon Performance of Tin Phosphate Based Negative Electrodes for Lithium Batteries, Oct. 5, 2001, Electrochimica Acta, 47 (2002) 1727-1738.*
Office Action issued in corresponding Japanese Patent Application No. 2006-155408 dated Jul. 8, 2008.

* cited by examiner

*Primary Examiner* — Helen O Conley
(74) *Attorney, Agent, or Firm* — Lee & Morse, P.C.

(57) ABSTRACT

A structure of a cathode electrode for a fuel cell includes a catalyst layer formed by mixing a carbon material with a catalyst material and a hydrophilic ion conductive material. The hydrophilic ion conductive material is embedded on the catalyst layer and contacts an electrolyte membrane and a diffusion layer to provide a migration path for water and hydrogen ions.

14 Claims, 5 Drawing Sheets

STRUCTURE OF CATHODE ELECTRODE FOR FUEL CELL

CROSS-REFERENCE TO RELATED APPLICATIONS

This application claims the benefit of Korean Application No. 2006-6585, filed Jan. 21, 2006, in the Korean Intellectual Property Office, the disclosure of which is incorporated herein by reference.

BACKGROUND OF THE INVENTION

1. Field of the Invention

An aspect of the present invention relates to a cathode electrode structure for a fuel cell, and more particularly, to a cathode electrode structure in which water produced at the cathode electrode does not block an oxygen supplying channel.

2. Description of the Related Art

A fuel cell is an electrical generation system that transforms chemical energy directly into electrical energy through a chemical reaction between oxygen and hydrogen contained in a hydrocarbon group material, such as methanol, ethanol, or natural gas. Fuel cells can be largely divided into direct liquid feed fuel cells in which liquid methanol is directly fed to the fuel cell and proton exchange membrane fuel cells in which hydrogen gas is supplied to the fuel cell.

As depicted in FIG. 1, a unit cell of a direct feed fuel cell has a membrane electrode assembly (MEA) structure having an electrolyte membrane 1 interposed between an anode electrode 2 and a cathode electrode 3. The anode electrode 2 and the cathode electrode 3 respectively include a diffusion layer 22 and 32 for supplying and diffusing a fuel, catalyst layers 21 and 31 where fuel oxidation and reduction reactions occur, and an electrode supporting layer 23 and 33. Conductive plates 4 and 5 are respectively installed on the electrode supporting layer 23 and 33, and the conductive plates 4 and 5 respectively include flow channels 41 and 51.

An electrode reaction of a direct methanol fuel cell (DMFC), which is a type of direct liquid feed fuel cell, includes an anode reaction wherein fuel is oxidized and a cathode reaction wherein hydrogen and oxygen are reduced as described below.

  [Reaction 1]

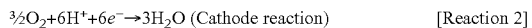  [Reaction 2]

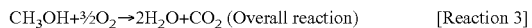  [Reaction 3]

Carbon dioxide, hydrogen ions, and electrons are produced at the anode electrode 2 where the fuel is oxidized (reaction 1). The hydrogen ions migrate to the cathode electrode 3 through electrolyte membrane 1. At the cathode electrode 3, water is produced by the reduction reaction (reaction 2) between hydrogen ions, electrons transferred from an external circuit, and oxygen. Accordingly, water and carbon dioxide are produced as the result of the overall electrochemical reaction (reaction 3) between methanol and oxygen.

The flow channel 41 is formed on a surface of the conductive plate 4 facing the cathode electrode 3. Water produced at the catalyst layer 31 of the cathode electrode 3 may block the flow of air supplying through the flow channel 41, and thus the stable power generation of the fuel cell may be obstructed.

SUMMARY OF THE INVENTION

Additional aspects and/or advantages of the invention will be set forth in part in the description which follows and, in part, will be obvious from the description, or may be learned by practice of the invention.

An aspect of the present invention provides a cathode electrode having a structure in which water produced at a catalyst layer of the cathode electrode does not block the supply of oxygen to the catalyst layer.

Another aspect of the present invention provides a fuel cell having the cathode electrode.

According to another aspect of the present invention, there is provided a structure of a cathode electrode, the structure contacting an electrolyte membrane and including a catalyst layer, a diffusion layer, and a electrode supporting layer, which are sequentially stacked, wherein the catalyst layer is formed by mixing a carbon material with a catalyst material and a hydrophilic ion conductive material, and the hydrophilic ion conductive material is embedded on the catalyst layer and contacts the electrolyte membrane and the diffusion layer to provided a migration path for water and hydrogen ions.

According to another aspect of the present invention, the hydrophilic ion conductive material may cover 10 to 50% of a surface of the catalyst layer.

According to another aspect of the present invention, the hydrophilic ion conductive material may be sprayed on the catalyst layer using a mask.

According to another aspect of the present invention, the hydrophilic ion conductive material may have a stripe shape having a width of 0.1 to 5 mm and an interval between the hydrophilic materials is 1 to 10 mm.

According to another aspect of the present invention, the hydrophilic ion conductive material may be formed of one selected from the group consisting of phosphate doped by $SnP_2O_7$, a $NH_4PO_3/TiP_2O_7$ composite, phosphate derived-hydrogel, phosphosilicate gel-polyimide composite, Zr tricarboxybutyl-phosphate/polyimide composite, phosphosilicate gel-polyimide composite, solid acid $Cs_5H_3(SO_4)_4$, hetero-acid $H_3PW_{12}O_{40}$/poly styrene sulfonic acids (PSS), and NAFION.

According to another aspect of the present invention, a hydrophobic material may be coated on a surface of the diffusion layer that contacts the catalyst layer.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
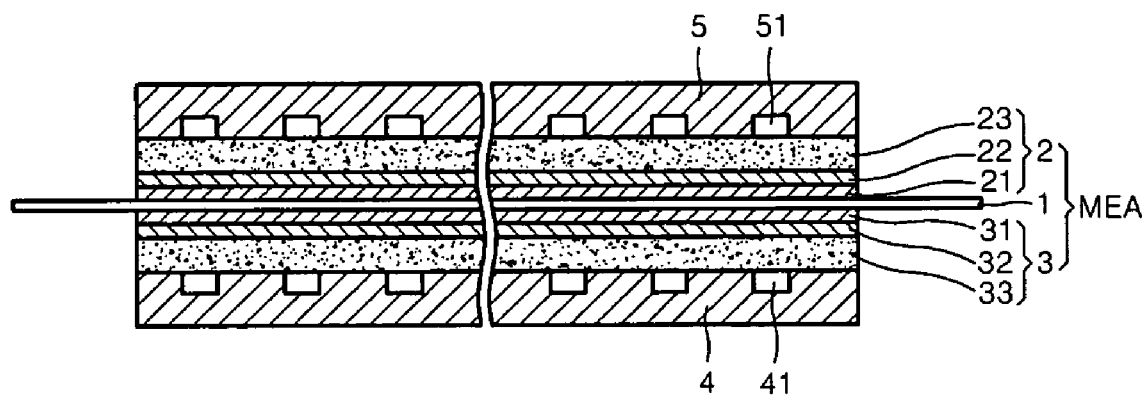
FIG. 1 is a cross-sectional view of the basic configuration of a conventional direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
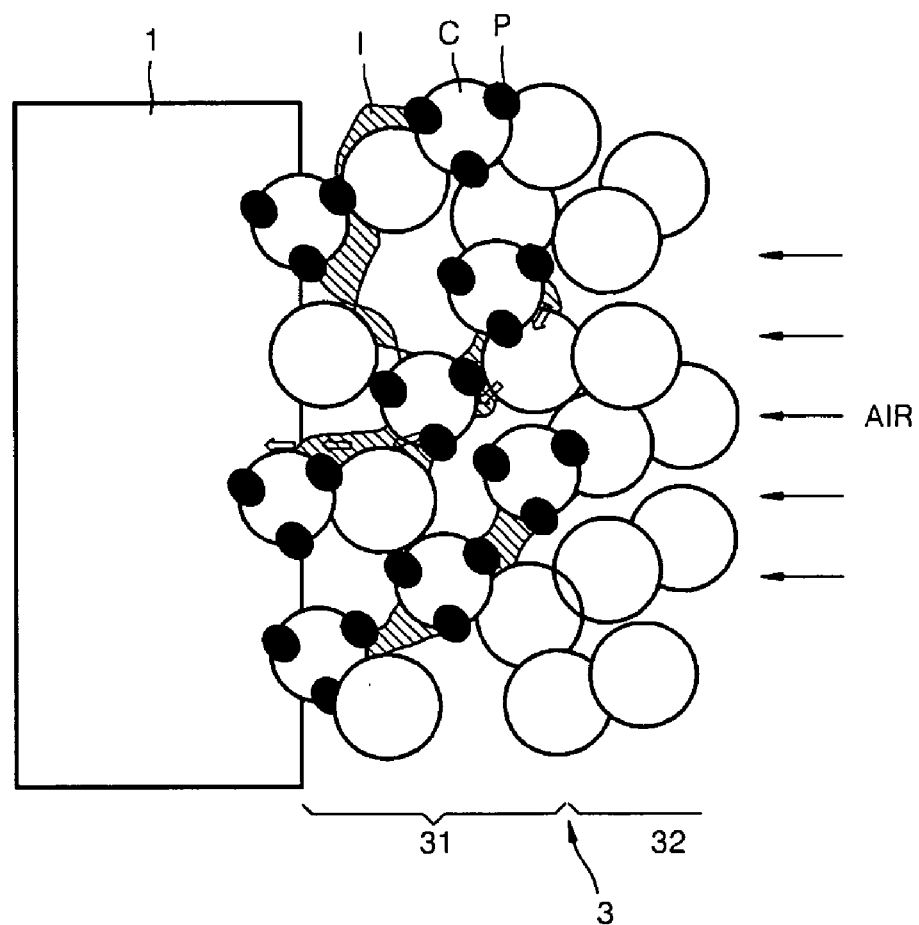
FIG. 2 is a schematic drawing of a cathode electrode of a conventional fuel cell.
Figure 3:
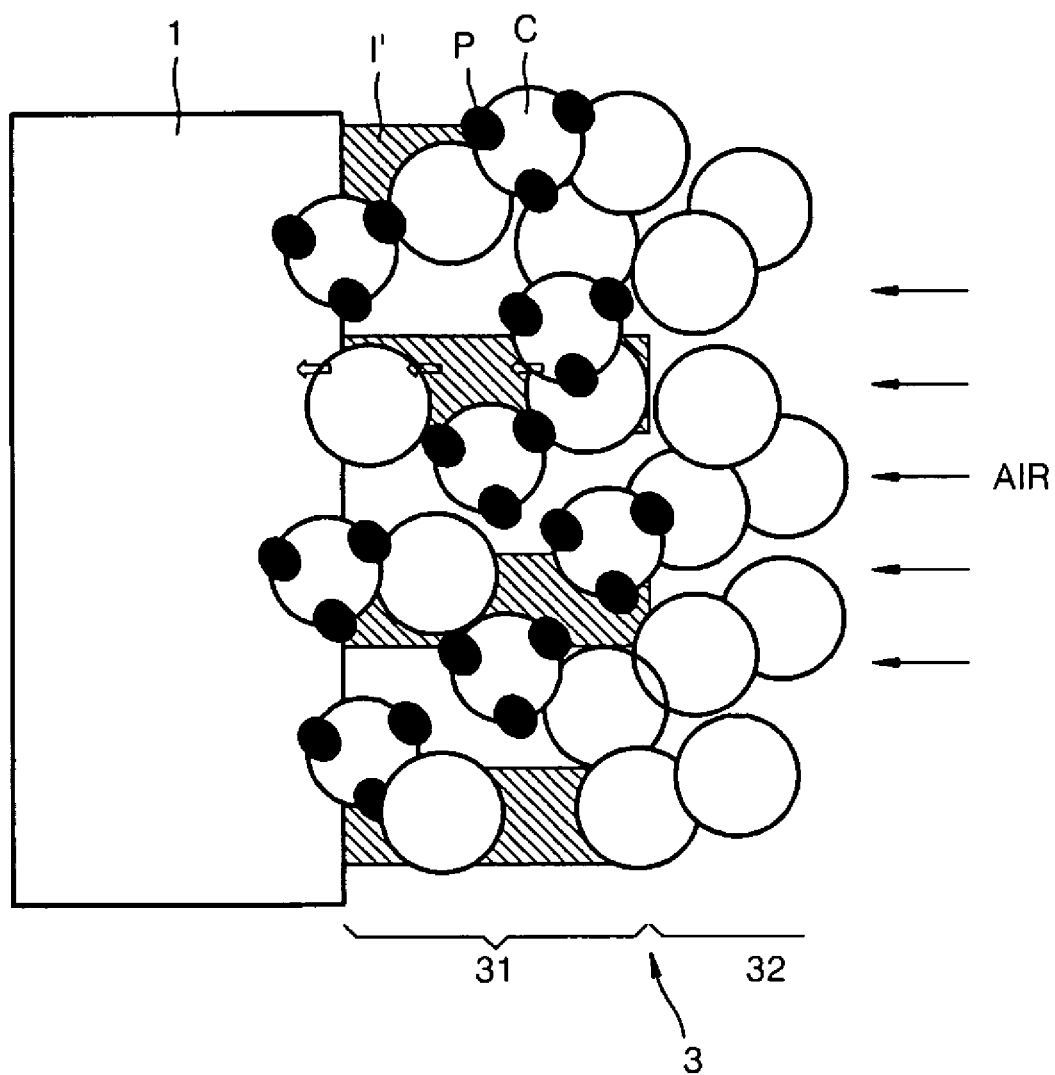
FIG. 3 is a schematic drawing of a cathode electrode of a fuel cell according to an embodiment of the present invention.

FIGS. 2 and 3 are schematic drawings of cathode electrodes of a conventional fuel cell and a fuel cell according to an embodiment of the present invention. Like reference numerals refer to substantially like elements throughout the drawings, and thus, detailed descriptions thereof will be omitted.

Referring to FIGS. 2 and 3, a cathode electrode 3 is attached to a surface of an electrolyte membrane 1. The cathode electrode 3 includes a catalyst layer 31, a diffusion layer 32, and an electrode supporting layer 33 (refer to FIG. 1).

The catalyst layer 31 has a thickness of approximately 30 µm and is a region where water is produced. The catalyst layer 31 is composed of carbon media C having a size of a few tens nm, catalysts having a size of few nm, for example, Pt catalyst P, and an ion conductive material I. The ion conductive material I facilitates the transportation of hydrogen ions together with water. A diffusion layer 32 having a thickness of approximately 50 µm and an electrode supporting layer 33 (see FIG. 1) having a thickness of a few hundreds µm are formed on the catalyst layer 31.

The electrolyte membrane 1 needs water to transport hydrogen ions. A portion of water produced at the cathode electrode 3 can migrate to the electrolyte membrane 1 and the rest of water can migrate to the diffusion layer 32.

Referring to FIG. 2, when the ion conductive material I is irregularly distributed at the catalyst layer 31, the ion conductive material I obstructs the air flow, which creates a long water moving path as indicated by the arrows. As a result, water is slowly discharged and the oxygen supply (air supply) to the catalyst layer 31 becomes unstable.

On the other hand, referring to FIG. 3, the ion conductive material which is a hydrophilic material (hereinafter, hydrophilic ion conductive material I') is formed at a short distance to the electrolyte membrane 1. Therefore, water produced at the catalyst layer 31 can rapidly migrate to the electrolyte membrane 1 or the diffusion layer 32. That is, an air flow to the catalyst layer 31 is not blocked by the hydrophilic ion conductive material I', and accordingly, a stable fuel cell performance can be obtained. The hydrophilic ion conductive material I' can be formed of one selected from the group consisting of phosphate doped by $SnP_2O_7$, a $NH_4PO_3/TiP_2O_7$ composite, phosphate derived-hydrogel, phosphosilicate gel-polyimide composite, Zr tricarboxybutyl-phosphate/polyimide composite, phosphosilicate gel-polyimide composite, solid acid $Cs_5H_3(SO_4)_4$, hetero-acid $H_3PW_{12}O_{40}$/poly styrene sulfonic acids (PSS), and NAFION.

The hydrophilic ion conductive material I' is deposited on the catalyst layer 31 to be used as water paths. The hydrophilic ion conductive material I' crosses the catalyst layer 31 along a thickness direction of the catalyst layer 31 in order to connect to the electrolyte membrane 1 and the diffusion layer 32. Regions of the catalyst layer 31 where the hydrophilic ion conductive material I' is not formed are used as air flow paths. The percentage of the region of the catalyst layer 31 where the hydrophilic ion conductive material I' is formed can be 10 to 50% of the catalyst layer 31, and preferably, 10 to 30%. The hydrophilic ion conductive material I' may have a stripe shape having a width of approximately 0.1 to 5 mm with an interval of 1 to 10 mm.

A hydrophobic material such as polytetrafluoroetylene (PTFE) or fluoroethylene prophylene (FEP) can be coated on a surface of the diffusion layer 32 that contacts the catalyst layer 31. This is to primarily supply water produced at the catalyst layer 31 to the electrolyte membrane 1.

Figure 4A:
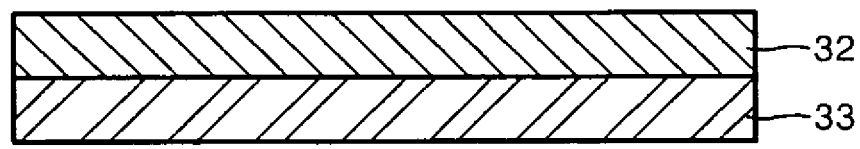
FIGS. 4A through 4C are cross-sectional views illustrating a method of manufacturing a fuel cell according to an embodiment of the present invention.
Figure 4B:
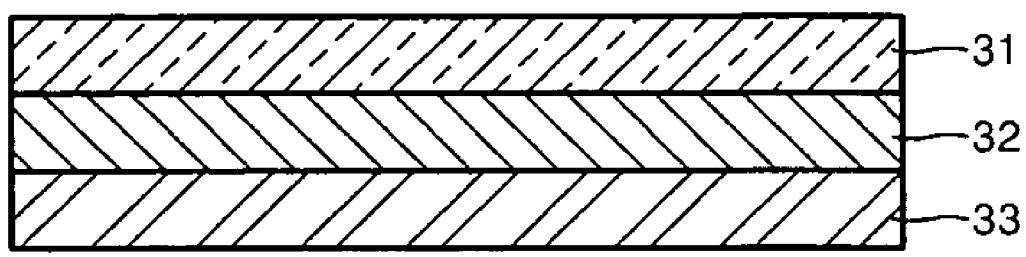
Figure 4C:
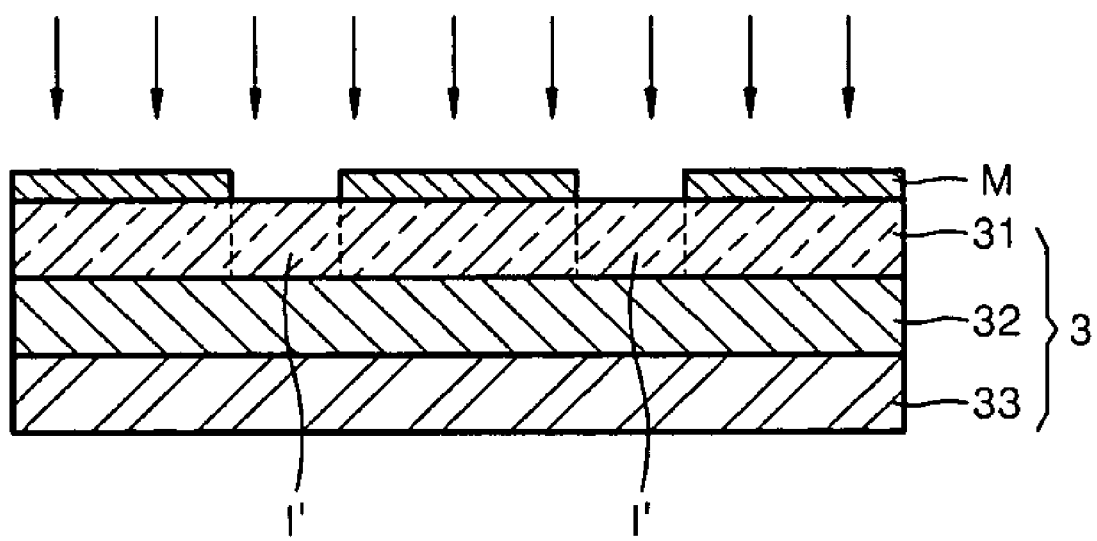

FIGS. 4A through 4C are cross-sectional views illustrating a method of manufacturing a fuel cell according to an embodiment of the present invention. Referring to FIG. 4A, a carbon support (carbon paper) 33 is dipped in a PTFE solution to contain 20 wt % of the PTFE. Next, a carbon slurry mixed with a 50 wt % PTFE solution is sprayed on the carbon support 33 to a thickness of 1.5 mg/cm², and is heat-treated at a temperature of 350° C. for 30 minutes to form a carbon diffusion layer 32.

Referring to FIG. 4B, a catalyst slurry is formed by mixing a catalyst material (6 mg/cm²) with a hydrophilic ion conductive material (1.3 mg/cm²). The catalyst slurry is sprayed on the carbon diffusion layer 32 to form a catalyst layer 31.

Referring to FIG. 4C, a NAFION solution which is a hydrophilic ion conductive material I' is sprayed on the catalyst layer 31 to a thickness of 1 mg/cm² using a mask M. The hydrophilic ion conductive material I' can have a stripe shape having a width of 0.5 mm with an interval of 3 mm. The hydrophilic ion conductive material I' may be formed to penetrate the catalyst layer 31.

Next, the cathode electrode 3 is heat-treated at a temperature of 80° C. for 2 hours.

The manufactured cathode electrode 3 and an anode electrode manufactured separately from the cathode electrode 3 are thermally compressed interposing the electrolyte membrane 1 therebetween at a temperature of 125° C. for 3 minutes with a two-ton pressure.

Figure 5:
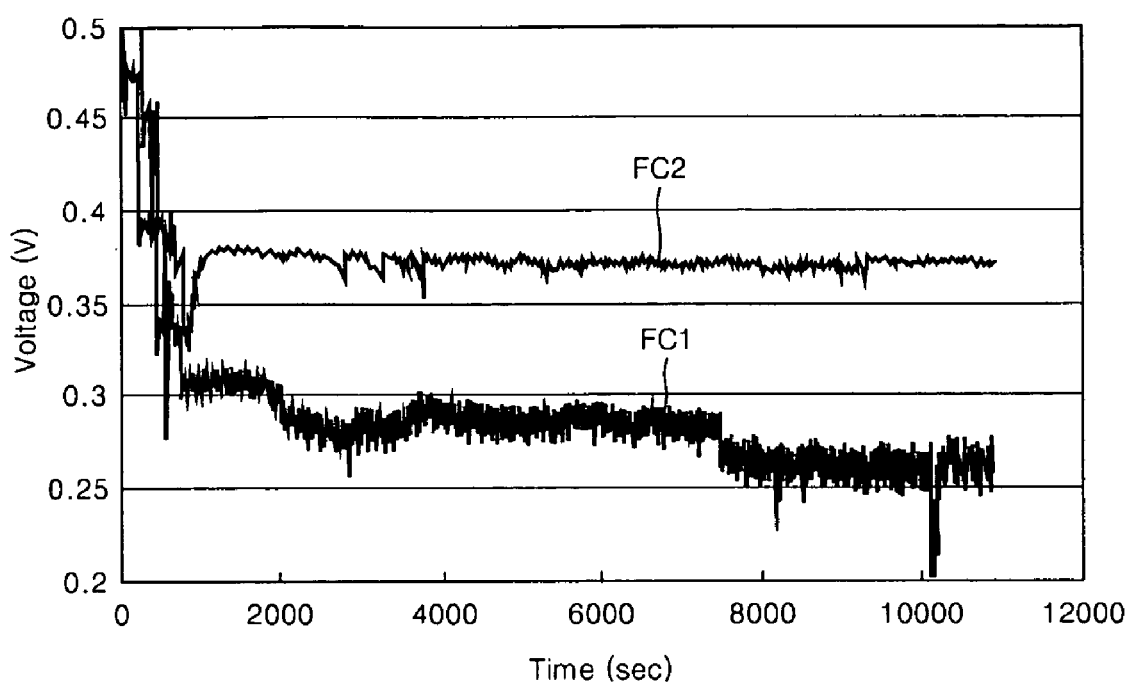
FIG. 5 is a graph showing 1.7 A static current test results of a conventional fuel cell and a fuel cell manufactured according to an embodiment of the present invention.

FIG. 5 is a graph showing 1.7 A static current test results of a conventional fuel cell and a fuel cell manufactured according to an embodiment of the present invention. 1M methanol and air of 1.7 times of stoichiometric ratio were supplied to the fuel cells. Voltages were measured at a temperature of 50° C., and an area of the unit cell was 10 cm².

Referring to FIG. 5, the conventional fuel cell (FC1) has a voltage variation of 30 mA/cm², but the fuel cell (FC2) according to an aspect of the present invention has a low voltage variation, i.e., 3 mA/cm². Thus, the hydrophilic ion conductive material I' according to an aspect of the present invention facilitates flow of water produced at the catalyst layer 31 of the cathode electrode 3, and accordingly, air supply to the catalyst layer 31.

Figure 6:
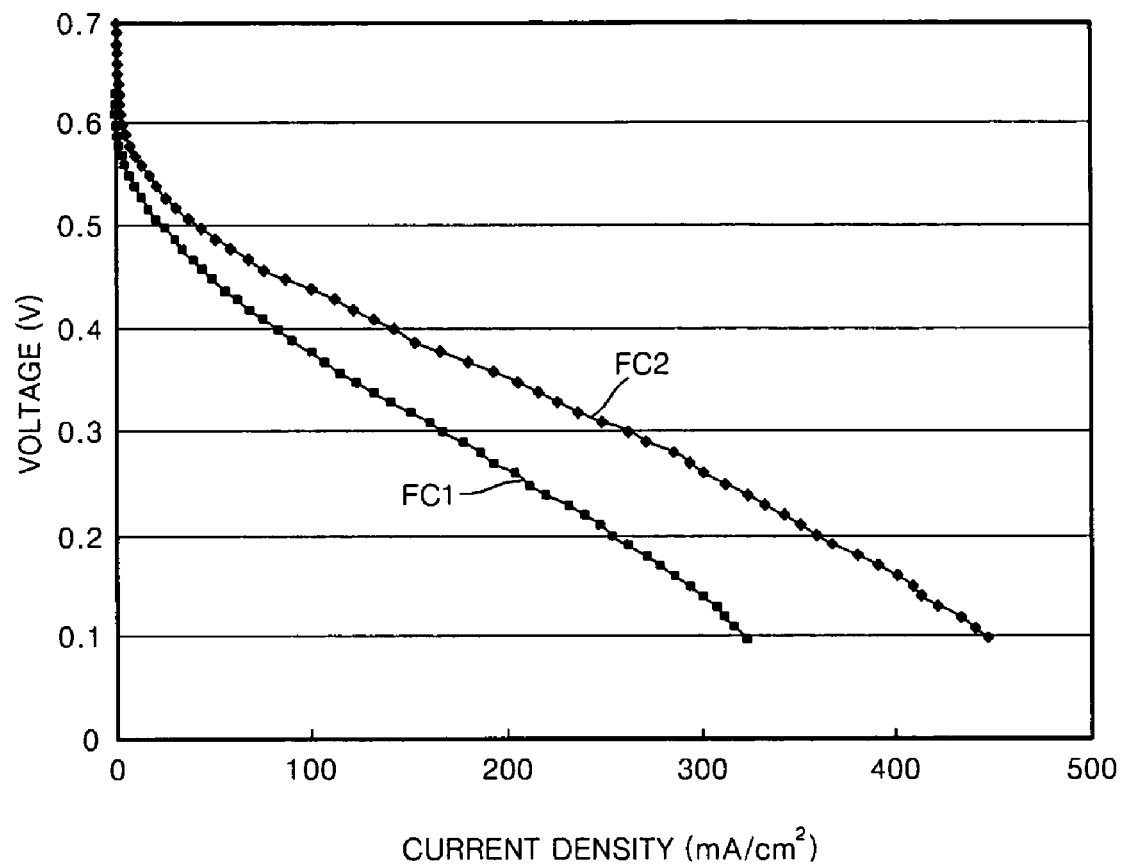
FIG. 6 is a graph showing I-V characteristics of a conventional fuel cell and a fuel cell manufactured according to an embodiment of the present invention.

FIG. 6 is a graph showing I-V characteristics of a conventional fuel cell and a fuel cell manufactured according to an embodiment of the present invention. 1M methanol and air of 1.7 times of stoichiometric ratio were supplied to the fuel cells. Voltages were measured at a temperature of 50° C., and an area of the unit cell was 10 cm².

Referring to FIG. 6, the fuel cell (FC2) according to an aspect of the present invention has a higher current density than the conventional fuel cell (FC1) in generating the same voltage. This is because water produced at the catalyst layer 31 was smoothly removed to smoothly generate electrochemical reactions at the catalyst layer 31.

An operation of a direct liquid feed fuel cell according to an embodiment of the present invention will now be described with reference to the above figures.

Water produced at the catalyst layer 31 of the cathode electrode 3 is supplied to the electrolyte membrane 1 along a shortest distance through the hydrophilic ion conductive material I', and surplus water is discharged to the outside through the diffusion layer 32 and the electrode supporting layer 33. Accordingly, in the catalyst layer 31 of the cathode electrode 3, water migration is smoothly achieved in regions where the hydrophilic ion conductive material I' is formed and air flow is smooth in regions where the hydrophilic ion conductive material I' is not formed. Accordingly, the cathode reaction is actively generated, thereby enabling the stability of the fuel cell, and eventually improving the performance of the fuel cell.

As described above, in the direct liquid feed fuel cell according to an aspect of the present invention, a hydrophilic ion conductive material formed on the catalyst layer of the cathode electrode rapidly makes water produced at the catalyst layer migrate to the electrolyte membrane or facilitates air flow in the catalyst layer where the hydrophilic ion conductive material is not formed, thereby stably maintaining an output voltage of a fuel cell.

While an aspect of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cathode electrode structure that contacts an electrolyte membrane and comprises a catalyst layer, a diffusion layer, and a electrode supporting layer sequentially stacked, wherein:
   the catalyst layer is formed by mixing a carbon material with a catalyst material and a hydrophilic ion conductive material,
   the hydrophilic ion conductive material is located across the catalyst layer along a thickness direction of the catalyst layer and contacts the electrolyte membrane and the diffusion layer to provide a migration path for water and hydrogen ions, and
   the hydrophilic ion conductive material is formed of one selected from the group consisting of phosphate doped by $SnP_2O_7$, a $NH_4PO_3/TiP_2O_7$ composite, phosphate derived-hydrogel, phosphosilicate gel-polyimide composite, Zr tricarboxybutyl-phosphate/polyimide composite, phosphosilicate gel-polyimide composite, solid acid $Cs_5H_3(SO_4)_4$, and hetero-acid $H_3PW_{12}O_{40}$/polystyrene sulfonic acids (PSS).

2. The cathode electrode structure of claim 1, wherein the catalyst layer comprises 10 to 50% by volume of the hydrophilic ion conductive material.

3. The cathode electrode structure of claim 1, wherein the hydrophilic ion conductive material is sprayed on the catalyst layer using a mask.

4. The cathode electrode structure of claim 1, wherein the hydrophilic ion conductive material has a stripe shape having a width of 0.1 to 5 mm and an interval between the hydrophilic ion conductive materials is 1 to 10 mm.

5. The cathode electrode structure of claim 1, wherein a hydrophobic material is coated on a surface of the diffusion layer that contacts the catalyst layer.

6. A fuel cell comprising a cathode electrode, the cathode electrode having a structure that contacts an electrolyte membrane and comprises a catalyst layer, a diffusion layer, and a electrode supporting layer sequentially stacked, wherein:
   the catalyst layer is formed by mixing a carbon material with a catalyst material and a hydrophilic ion conductive material,
   the hydrophilic ion conductive material is located across the catalyst layer along a thickness direction of the catalyst layer and contacts the electrolyte membrane and the diffusion layer to provide a migration path for water and hydrogen ions, and
   the hydrophilic ion conductive material is formed of one selected from the group consisting of phosphate doped by $SnP_2O_7$, a $NH_4PO_3/TiP_2O_7$ composite, phosphate derived-hydrogel, phosphosilicate gel-polyimide composite, Zr tricarboxybutyl-phosphate/polyimide composite, phosphosilicate gel-polyimide composite, solid acid $Cs_5H_3(SO_4)_4$, and hetero-acid $H_3PW_{12}O_{40}$/polystyrene sulfonic acids (PSS).

7. The fuel cell of claim 6, wherein the catalyst layer comprises 10 to 50% by volume of the hydrophilic ion conductive material.

8. The fuel cell of claim 6, wherein the hydrophilic ion conductive material is sprayed on the catalyst layer using a mask.

9. The fuel cell of claim 6, wherein the hydrophilic ion conductive material has a stripe shape having a width of 0.1 to 5 mm and an interval between the hydrophilic ion conductive materials is 1 to 10 mm.

10. The fuel cell of claim 6, wherein a hydrophobic material is coated on a surface of the diffusion layer that contacts the catalyst layer.

11. A cathode electrode contacting an electrolyte membrane, the cathode electrode comprising a catalyst layer, a diffusion layer, and an electrode supporting layer sequentially stacked, wherein:
    the catalyst layer is formed by mixing a carbon material with a catalyst material and a hydrophilic ion conductive material,
    the hydrophilic ion conductive material forms a plurality of members spaced apart from each other and embedded in the catalyst layer and contact the electrolyte membrane and the diffusion layer to provide a migration path for water and hydrogen ions,
    each of the plurality of members is located across the catalyst layer along a thickness direction of the catalyst layer, and
    the hydrophilic ion conductive material is formed of one selected from the group consisting of phosphate doped by $SnP_2O_7$, a $NH_4PO_3/TiP_2O_7$ composite, phosphate derived-hydrogel, phosphosilicate gel-polyimide composite, Zr tricarboxybutyl-phosphate/polyimide composite, phosphosilicate gel-polyimide composite, solid acid $Cs_5H_3(SO_4)_4$, and hetero-acid $H_3PW_{12}O_{40}$/polystyrene sulfonic acids (PSS).

12. The cathode electrode of claim 11, wherein the hydrophilic ion conductive material is sprayed on the catalyst layer using a mask.

13. The cathode electrode of claim 12, wherein each of the plurality of members have a stripe shape having a width of 0.1 to 5 mm and an interval between the plurality of members is 1 to 10 mm.

14. The cathode electrode of claim 11, wherein water produced at the catalyst layer of the cathode electrode is supplied to the electrolyte membrane along a shortest distance through the hydrophilic ion conductive material, and surplus water is discharged to the outside through the diffusion layer and the electrode supporting layer.

* * * * *